Fig. 4.

May 14, 1963  D. W. MOLINS ET AL  3,089,497
TOBACCO MANIPULATING MACHINES
Filed Sept. 14, 1959  9 Sheets-Sheet 6

INVENTORS
Desmond W. Molins
Gordon F. W. Powell
Frederick Pocock
BY
Watson, Cole, Grindle & Watson
ATTORNEYS

Fig. 9.

May 14, 1963  D. W. MOLINS ET AL  3,089,497
TOBACCO MANIPULATING MACHINES
Filed Sept. 14, 1959  9 Sheets-Sheet 8

INVENTORS
Desmond W. Molins
Gordon F. W. Jewell
Frederick Pocock
BY
Watson, Cole, Grindle & Watson
ATTORNEY May 14, 1963

D. W. MOLINS ET AL 3,089,497

TOBACCO MANIPULATING MACHINES

Filed Sept. 14, 1959

INVENTORS
Desmond W. Molins
Gordon F. W. Fawell
Frederick Pacock
BY
Watson, Cole, Grindle & Watson
ATTORNEY

United States Patent Office 3,089,497
Patented May 14, 1963

3,089,497
TOBACCO MANIPULATING MACHINES
Desmond Walter Molins, Gordon Francis Wellington Powell, and Frederick Pocock, Deptford, London, England, assignors to Molins Machine Company Limited, London, England, a British company
Filed Sept. 14, 1959, Ser. No. 839,639
Claims priority, application Great Britain Sept. 15, 1958
29 Claims. (Cl. 131—21)

This invention concerns improvements in or relating to machines for manipulating tobacco, such as continuous rod cigarette-making machines, on which a continuous tobacco filler rod is formed.

The term "filler rod" is used herein to describe the relatively narrow elongated tobacco rod, commonly formed on an endless conveyor after showering tobacco through an elongated chute onto said endless conveyor, said rod moving in the direction of the width of the shower.

According to the present invention there is provided a method of detecting variations in the uniformity of a continuous tobacco filler rod as it is produced on a machine (e.g. on a continuous rod cigarette-making machine) which method comprises detecting variations in air-permeability of the filler rod along the length of the latter. The said variations in air-permeability may be detected by passing air through the filler rod and detecting variations in a characteristic (e.g. pressure) of the airflow, which variations result from differences in the resistance to the passage of air through the filler rod at different positions along the length of the filler rod. The filler rod may be carried on an air-pervious conveyor, and air caused to pass through the conveyor in addition to passing through the filler rod.

The operation of the machine may be regulated or modified in accordance with the said variations in air-permeability of the filler rod, in such a way as to reduce variations in the uniformity of the filler rod. For example, the operation of the machine may be modified by effecting a trimming operation on the filler rod, which trimming operation is controlled in accordance with the said variations in air-permeability of the filler rod.

The method may also comprise the further step of measuring the mass per unit length of the filler rod (e.g. by means of penetrative radiation such as beta radiation) the operation of the machine also being regulated or modified in accordance with variations in mass per unit length of the filler rod as indicated by such measurement. The said trimming operation may be controlled in accordance with the said variations in mass per unit length of the filler rod as well as in accordance with the said variations in air-permeability of the filler rod.

The operation of the machine may be regulated or modified in accordance with long term variations in the mass per unit length of the filler rod, and in accordance with short term variations in air-permeability of the filler rod. Further, the rate at which tobacco is supplied to the filler rod may be regulated in accordance with variations (e.g. long-term variations) in the mass per unit length of the filler rod. Further according to the invention there is provided a method of reducing variation of draw characteristics as between different cigarettes produced by the continuous rod method which comprises passing air through the tobacco filler rod to detect variations in air permeability of the filler rod and modifying or regulating the amount of tobacco forming the filler rod in accordance with said variations. Variations in the mass per unit length of the filler rod may be detected additionally, and the amount of tobacco forming the filler rod controlled additionally to reduce variations in the mean mass per unit length of the filler rod.

Still further according to the invention there is provided a tobacco-manipulating machine, such as a continuous rod cigarette-making machine, comprising detector-means to detect variations in the uniformity of a continuous tobacco filler rod formed on the machine, said detector-means comprising means to detect variations in air-permeability of the filler rod along the length of the latter. The machine may comprise means to cause air to pass through the filler rod, the said detector-means comprising means to detect variations in a characteristic (e.g. pressure) of the airflow, which variations result from differences in the resistance to the passage of air through the filler rod at different positions along the length of the filler rod. The machine may comprise an air-pervious conveyor by which the filler rod is carried, and means to cause air to pass through the conveyor as well as through the filler rod. There may be provided means actuated by said detector-means to regulate or modify the operation of the machine in accordance with the said variations in air-permeability of the filler rod, so as to reduce variations in the uniformity of the filler rod as indicated by said detector-means.

The machine may comprise a trimming device arranged to remove surplus tobacco from the filler rod and thereby regulate or modify the operation of the machine, and means to vary the operation of the trimming device so as to cause it to remove more or less surplus tobacco, said last-named means being operatively connected to and actuated by the said detector-means. The said trimming device may be located downstream of a position at which variations in air-permeability of the filler rod are detected.

The machine may comprise a measuring device (e.g. including a source of penetrative radiation such as beta radiation) arranged to measure the mass per unit length of the filler rod, and means actuated by the said measuring device to regulate or modify the operation of the machine in cooperation with the said means actuated by the said detector-means. The said means to vary the operation of the trimming device may be also operatively connected to and actuated by the said measuring device. There may be provided means actuated by the said measuring device and arranged to regulate the rate at which tobacco is supplied to the filler rod.

The trimming device may be mounted for bodily movement relatively to the filler rod, the said means to vary the operation of the trimming device being arranged to cause such bodily movement. The said trimming device may be arranged to have said bodily movement imparted to it by a member which is coupled to the said means actuated by said detector-means on the one hand, and by the said means actuated by said measuring device on the other hand. The said means actuated by said measuring device may be actuated in response to long-term variations in the mass per unit length of the filler rod, while the said means actuated by the said detecting device may be actuated in response to short-term variations in air-permeability of the filler rod.

The said measuring device may be located downstream of the trimming device so as to measure the trimmed filler rod, whereby the said measuring device exercises a check or control on the operation of the trimming device as regulated by the said detector device. The said trimming device may be arranged for said bodily movement in directions toward and away from the said conveyor. The machine may comprise a chamber having an opening adjacent the conveyor at that side of the latter remote from the filler rod, the means to cause air to pass through the filler rod being arranged to draw air from the chamber so that variations in air pressure occur within the chamber. The said opening may have substantially the same width as the filler rod and have a length substantially equal to the length of a tobacco article, such as a cigarette, to be produced by the machine.

The said detector-means to detect variations in air-permeability of the filler rod may comprise a flexible element one side of which is subjected to the air pressure in the chamber so as to be movable in response to variations in the pressure in the chamber. The said flexible element may form part of a container whose interior is in communication with the interior of the chamber and whose exterior is exposed to atmosphere.

The machine may comprise a hydraulic amplifier having an input member arranged to be operated in response to movements of the said flexible element and an output member arranged to effect bodily movement of the trimming device, whereby the said bodily movement is effected in response to pressure variations in the said chamber. The machine may further comprise a support member supporting said trimming device for bodily movement, opposite ends of said member being operatively connected to the detector-means and the said measuring device respectively.

The filler rod may be held by suction to an air-pervious conveyor which carries it lengthwise. There may be provided an indicating device to give a visual indication of the variations in a characteristic, e.g. pressure, of the air-flow.

Still further according to the invention there is provided a continuous rod cigarette-making machine comprising an air-pervious conveyor on which the filler rod is conveyed lengthwise, suction means to draw air through the filler rod and conveyor to hold the filler rod thereon, a chamber on that side of the conveyor remote from the filler rod and having an opening adjacent the conveyor, a source of suction to draw air through the filler rod, the conveyor and the chamber, pressure-responsive means responsive to variations in air pressure in the chamber, a trimming device arranged to trim excess tobacco from the filler rod downstream of the chamber, an adjustable mechanical linkage supporting said trimming device for movement towards and away from the conveyor to vary the amount of excess tobacco removed from the filler rod and thus its cross-sectional area, a hydraulic amplifier having an output member arranged to adjust said linkage and an input member arranged to be operated by the pressure-responsive means, a measuring device utilising a source of beta radiation for measuring variations in the mass per unit length of the trimmed filler rod, and electrical servo-mechanism arranged to adjust said linkage in response to variations in the absorption of beta rays by the filler rod.

Apparatus in accordance with the invention will now be described by way of example with reference to the accompanying drawings, in which.

Figure 1:
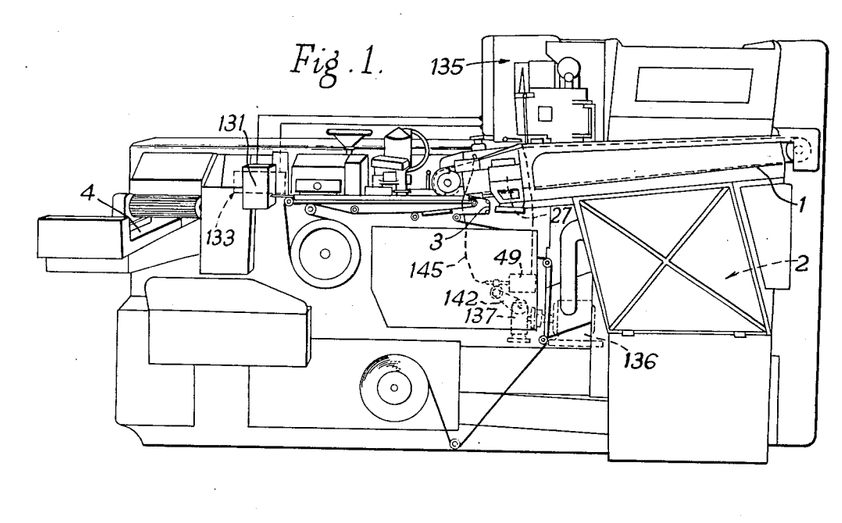
FIGURE 1 is a front elevation of a continuous rod cigarette-making machine in accordance with the invention.
Figure 10:
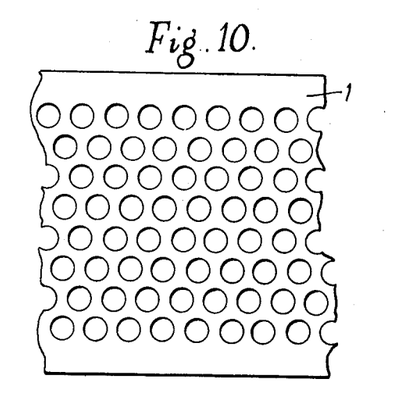
FIGURE 10 shows, to a greatly enlarged scale, a fragment of a perforated air-pervious conveyor band.

In the machine illustrated in FIGURE 1, cut tobacco is fed by a current of air to a perforated metal conveyor band 1 (a fragment of which, greatly enlarged, is shown in FIGURE 10) which runs through the upper part of a narrow passage 2 through which the air flows upwardly. The tobacco so fed is suctionally held on the underside of the conveyor band 1, on which the tobacco builds up to form a continuous tobacco stream or first filler which is carried by the band from right to left as viewed in FIGURE 1. Beyond the passage 2, the tobacco stream or filler rod is subjected to a trimming operation to remove surplus tobacco and thereby reduce variations in uniformity of the stream or filler rod, and this operation may be said to result in the production of a continuous trimmed filler rod. This filler rod is transferred from the conveyor band 1 on to a continuous paper web 3, and after the filler rod has passed beneath a compression tongue, the paper is folded and secured around it to form a continuous cigarette rod. This rod is severed at appropriate intervals, by suitable cut-off mechanism, to form individual cigarettes, which are deflected on to a catcher band 4. These rod forming and cutting devices are orthodox and need no detailed description.

Figures 2, 3:
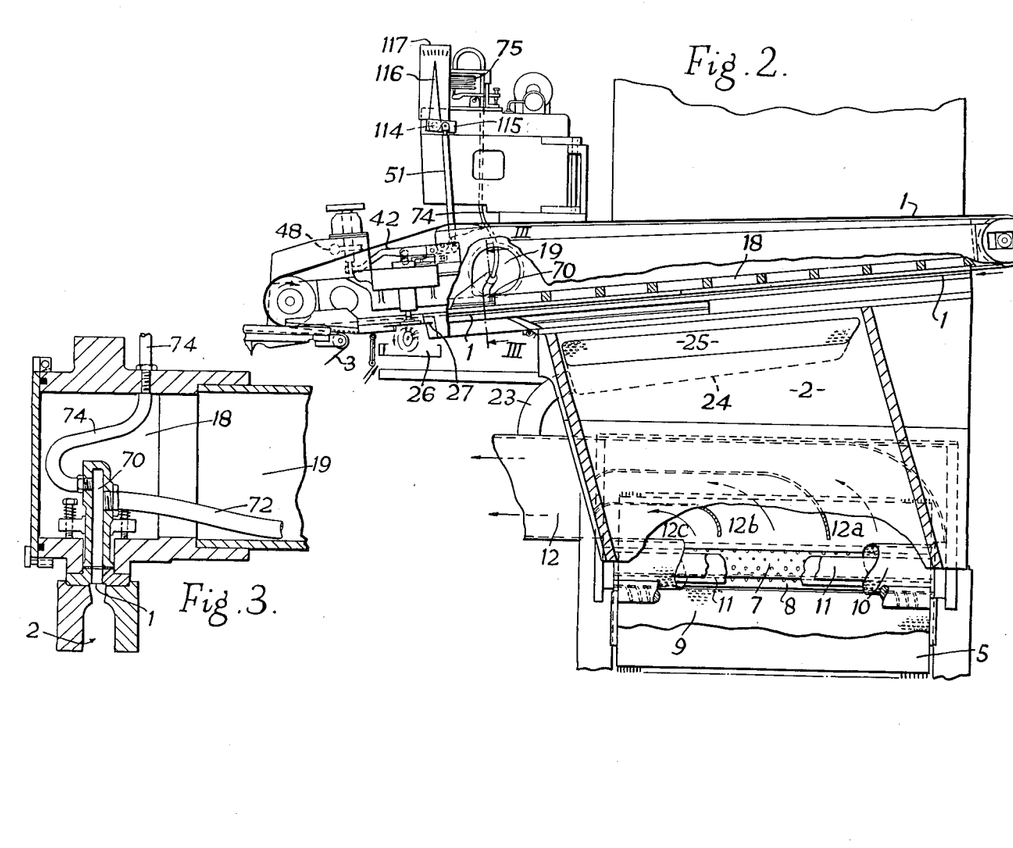
FIGURE 2 is a sectional view, with parts broken away, of part of the machine shown in FIGURE 1.
FIGURE 3 is a section taken on the line III—III, FIGURE 2, to a larger scale.
Figure 4:
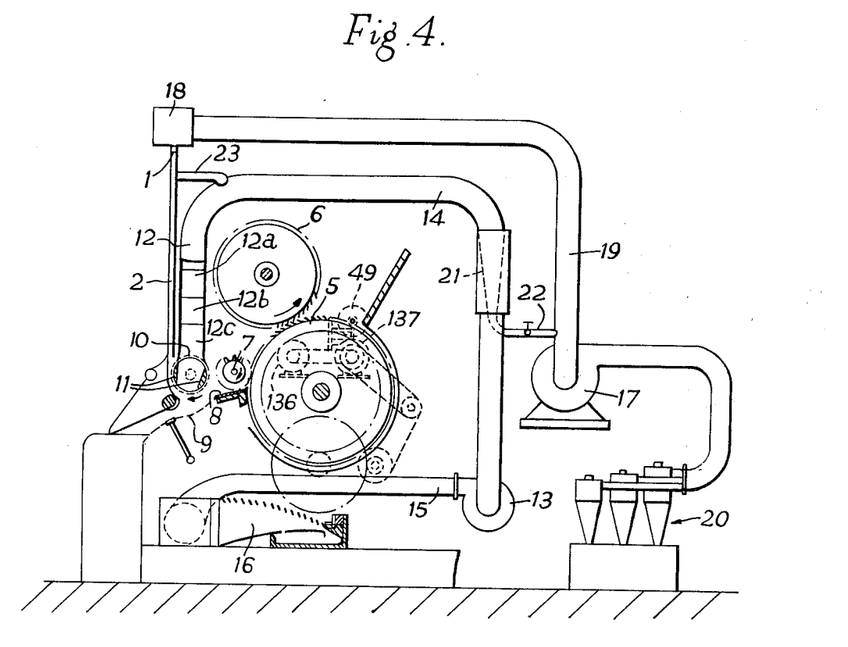
FIGURE 4 is a sectional end view of tobacco-feeding apparatus in the machine shown in FIGURE 1, and diagrammatically illustrates arrangements for causing air to flow through the machine, FIGURE 5 diagrammatically illustrates arrangements whereby the operation of the machine is regulated or modified.

FIGURES 2 and 4 show in more detail the arrangements for feeding tobacco to the conveyor band 1. The tobacco is fed, for example in the manner disclosed in the specification and drawings of U.S. patent application Serial No. 769,482, filed October 24, 1958, now Patent No. 3,062,357, on to the upper surface of a carded drum 5, FIGURES 2 and 4, which carries it past a brushing roller 6, and from which it is picked and thrown forwardly by a picker roller 7 which impels the tobacco over a guide plate 8 toward the entrance to the passage 2. Air is caused to flow upwardly through a grill 9 into the passage 2, and also through a perforated rotating cylinder 10 which rotates past fixed elements 11, the cylinder 10 and elements 11 being shown broken away in FIGURE 2. Air is drawn through the rotating cylinder 10 into and through a duct 12, which adjacent the cylinder is divided into three sections 12a, 12b and 12c; these are represented diagrammatically in FIGURE 4.

Air is drawn through the cylinder 10 and duct 12 by a suction fan 13, FIGURE 4, by way of a conduit 14, and is discharge by way of a conduit 15 into a diffuser chamber 16 from which it flows upwardly through the grill 9.

A further suction fan 17 draws air through the passage 2, a suction chamber 18, and a conduit 19, and discharges it to atmosphere through a multi-unit cyclone 20 by which dust is separated from the air, which latter is discharged to atmosphere.

Within the conduit 14 is a dust-separating device 21, by which dust is extracted and passed with some air through a pipe 22 into the conduit 19.

A pipe 23 connects the passage 2 with the conduit 12 (see also FIGURE 2) through a suction chamber 24 and a grill 25 in the passage 2, so that some of the air flowing through the passage is drawn off before reaching the conveyor band 1. This arrangement is as disclosed in the specification and drawings of U.S. patent application Serial No. 801,683, filed March 16, 1959, now Patent No. 3,019,793, and is for the purpose of increasing the velocity of the air stream in the passage.

By the arrangement described above, tobacco impelled by the picker roller 7 is caused, by the air flowing into and through the perforated cylinder 10 to move through a generally arcuate path into the passage 2. The arrangements for thus changing the direction of the tobacco are more fully described in the specification of U.S. patent application Serial No. 738,805, filed May 29, 1958, now Patent No. 3,030,965. The air stream which flows up through the passage 2 has a high velocity, and accelerates and generally ensures separation of the particles of tobacco which are fed into the passage, so that this tobacco reaches the conveyor band 1 substantially in the form of separated particles, as also described in the specification just mentioned.

Tobacco is fed to the conveyor band 1 in such quantity as to form a filler rod having an excess of tobacco, which excess is removed by the trimming operation mentioned above. The filler rod as originally formed (including the excess) contains varying quantities of tobacco along its length, and the purpose of the trimming operation is to reduce these inequalities while reducing the cross-sectional size of the filler rod.

Referring particularly to FIGURE 2, a trimming device, generally indicated by the reference numeral 26, and which performs the trimming operation mentioned above, comprising a pair of rotating discs 27 mounted adjustably at a suitable level beneath that of the conveyor band 1. A brush 28 is mounted for rotation beneath the discs 27 and assists in the trimming operation by helping to separate tobacco which is below the level of the discs from that which is above that level. The arrangement and mounting of the trimming device will now be described more fully with reference to FIGURES 6, 7 and 8.

Figure 6:
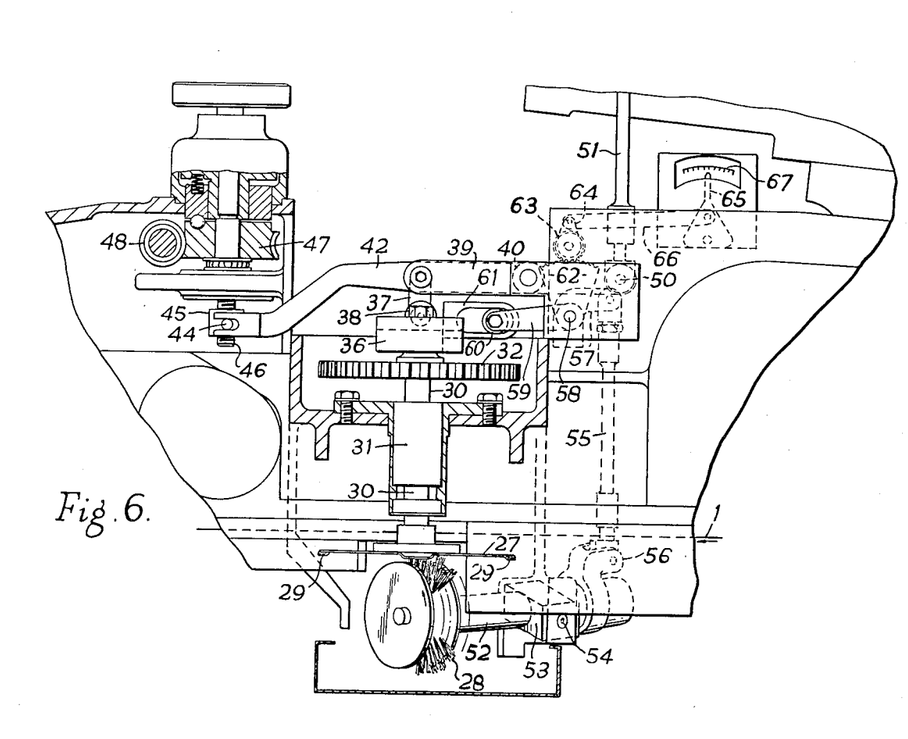
FIGURE 6 is a view, partly in section, illustrating a trimming device and its mounting.
Figure 8:
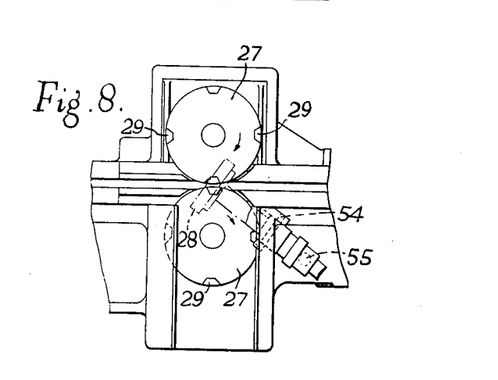
FIGURE 8 is an underneath plan view of part of the mechanism shown in FIGURE 6.

As shown in FIGURES 6 and 8, each of the discs 27 is provided at its edge with four equi-spaced, downwardly recessed portions 29. When on rotation of the discs a pair of these recessed portions meet as shown in FIGURE 8, less tobacco is removed from that part of the filler rod in which they engage than is removed from those parts engaged by the plain portions of the disc edges. This results in the trimmed filler rod having more tobacco at definite spaced positions than elsewhere, in order that when the filler rod is compressed to rod size, those portions through which the rod is cut to cigarette lengths will contain denser tobacco than intermediate portions, and the cigarettes produced will have "dense ends."

The discs 27 are fixed on the ends of vertical spindles 30 which are slidable up and down, and also rotatable, in bearings in sleeves 31, FIGURE 6. Near the upper ends of the spindles 30 are fixed a pair of gear wheels 32, FIGURES 6 and 7, one of which is driven by a gear wheel 33, FIGURE 7. The gear wheel 33, which is rotated by means of a belt 34 driving a pulley 35 fixed to the gear wheel 33, is a little wider than the gear wheel 32 which it drives, so as to permit up and down movement of the latter gear wheel.

The upper ends of the spindles 31 are rotatably supported in bearings in opposite ends of a yoke 36, which therefore supports the discs 27. The yoke 36 is supported by a link 37 pivoted at one end to a lug 38 on the yoke, and pivoted at its other end on a lever 39 formed on a rotatable sleeve 40 from which extends a further lever 41, see FIGURE 7. The free end of the lever 41 is pivotally connected to a long lever 42, approximately midway along the length of the latter, by a pin 43.

Figure 7:
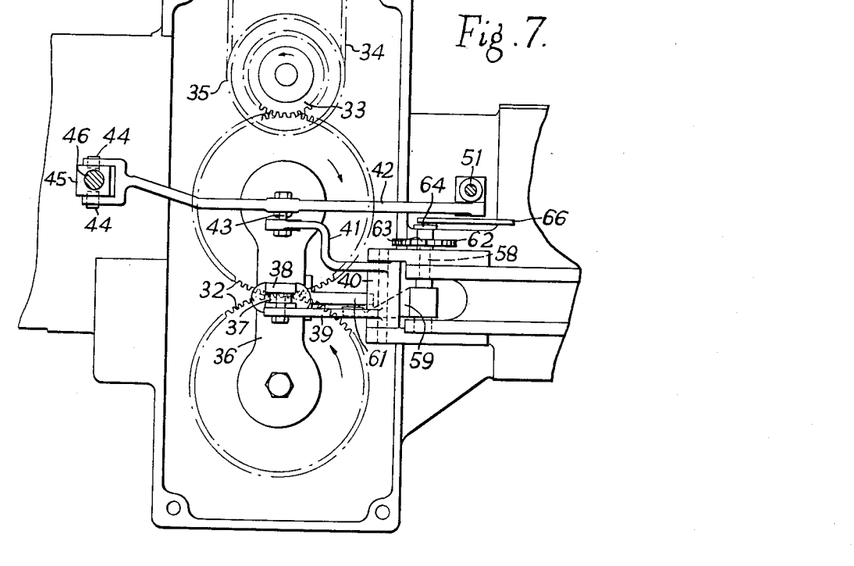
FIGURE 7 is a plan view of some of the mechanism shown in FIGURE 6.

The left-hand end of the lever 42, as viewed in FIGURES 6 and 7, is forked, the ends of the forks being slotted to receive projections 44 extending from a block 45. The block has a threaded aperture to receive a screw 46, which is rotatable in one direction or the other to raise or lower the end of the lever 42. The screw 46 is rotated by a wormwheel 47 fixed thereto and driven by a worm 48, FIGURE 6. Rotation of the worm 48 is effected by a reversible motor shown diagrammatically at 49 in FIGURE 5.

The other end of the lever 42 is pivoted at 50 on the lowermost end of a downwardly extending rod 51. This rod is arranged to be moved lengthwise up and down in a manner shortly to be described.

Thus the position of the discs 27, that is, their distance from the conveyor band 1, is controlled by the worm 48 on the one hand, and the rod 51 on the other.

The brush 28 is mounted on a shaft 52, FIGURE 6, and is rotated by a pulley and belt drive, not shown. Arrangements are provided for raising and lowering the brush together with the discs 27. For this purpose the shaft 52 is journalled in a block 53 pivoted at 54 and arranged to be swung about its pivot by a rod 55 pivoted on an extension 56. The rod 55 is moved up and down by a lever 57 fixed on a rock-shaft 58 on which is also fixed a lever 59. A roller 60 on the free end of the lever 59 is accommodated in a slot in an extension 61 fixed to the yoke 36. Thus the up and down movements of the yoke 36, which raise and lower the discs 27, also effect a corresponding raising and lowering of the brush 28 through the linkage just described.

Also fixed on the shaft 58 is an arcuate rack 62, whose teeth mesh with a pinion 63. A short lever 64 fixed to the pinion 63 transmits swinging motion to a pivoted indicator needle 65 through a link 66. The needle 65 moves over a scale 67 suitably calibrated, and gives a visual indication of the position of the trimming discs 27 at any instant, and of the extent to which they move up or down.

Referring now to FIGURES 2 and 3, a short distance beyond the passage 2, but upstream of the trimming device 26 (that is, to the right of the trimming device as viewed in FIGURE 2), a small chamber or air cell 70 is located inside the suction chamber 18. As best seen in FIGURE 3, this chamber 70 has an opening adjacent the perforated conveyor band 1, and the width of the chamber and opening is approximately the same as the width of the conveyor band. The length of the opening is approximately the length of one cigarette.

A flexible pipe 72, FIGURE 3, communicating with the interior of the chamber or cell 70, extends into the conduit 19 which is the main air exhaust duct for the suction chamber 18. Consequently air is drawn through the conveyor band 1, the small chamber 70, and the pipe 72 substantially independently of the flow of air through the conveyor and suction chamber 18 elsewhere along the conveyor.

Figure 9:
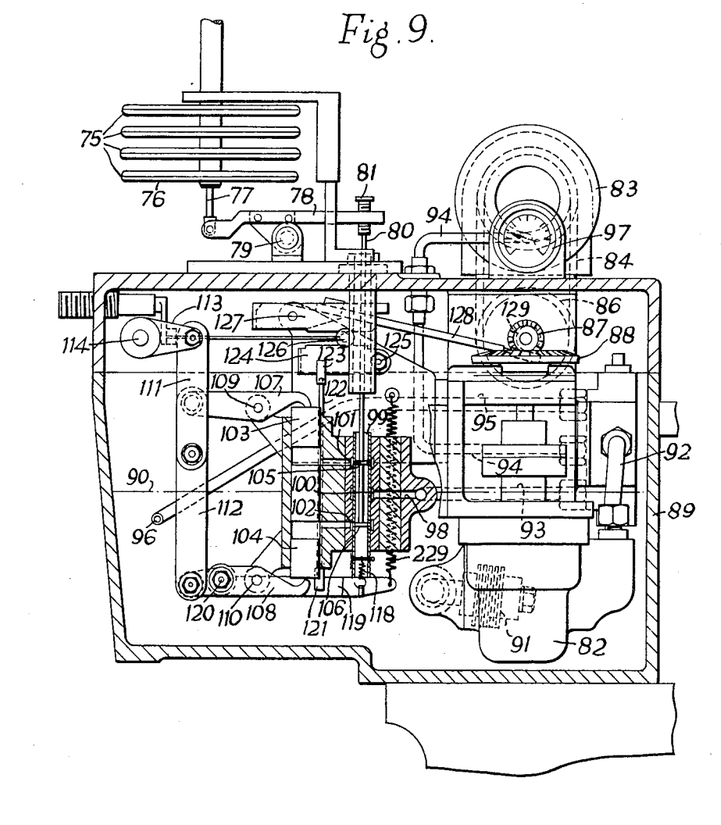
FIGURE 9 is a sectional elevation of a hydraulic amplifying device.

A further pipe 74, FIGURES 2 and 3, extends from the chamber or air cell 70 to a pile or stack of flexible air capsules 75, FIGURE 2 and also FIGURE 9, with which it communicates so that the air pressure within the capsules corresponds to that within the chamber 70.

The flexible element 76 constituting the lower wall of the lowermost capsule of the pile 75 has fixed to it a short rod 77, best seen in FIGURE 9, which is pivoted to a lever 78 which is itself pivoted at 79. The arrangement and mounting of the pile of capsules is such that the element 76 is caused to move inwardly or outwardly in response to changes in air pressure in the capsules, and the rod 77 accordingly turns the lever 78 in one direction or the other about its pivot 79.

As shown in FIGURE 9, a rod 80 is adjustably connected to the free end of the lever 78 by a screw 81 threaded through the lever. This rod forms part of a sensitive valve 105, 106 of a hydraulic amplifier, FIGURE 9, to be described later, by which small movements of the rod are translated to a piston device 103, 104, also in FIGURE 9, which is capable of applying sufficient force to effect lengthwise movement of the rod 51, FIGURES 2 and 6, and thereby raise or lower one end of the lever 42, from which the trimming discs 27 are supported. Accordingly, that end of the lever 42 is moved in accordance with changes or variations in a characteristic of the airflow through the tobacco filler rod carried by the conveyor 1 past the air cell or chamber 70, namely the air pressure existing within the chamber 70, since this pressure is transmitted to the capsules 75 which control the movements of the sensitive valve.

As the tobacco filler rod moves lengthwise past the chamber 70 the air pressure in the chamber will fluctuate according to variations in air-permeability of the filler rod at different portions along its length, or, in other words, in accordance with variations in the resistance offered by the filler rod, at different portions along its length, to the flow of air through and across the filler rod, transversely of its length, into the chamber 70. These differences in resistance are, in general, due to differences in the quantity of tobacco contained in the filler rod at different portions along its length. As explained above, the filler rod is held on the conveyor band 1 by suction. This suction is sufficiently strong to compress the filler rod laterally (i.e. in a direction transverse to its length) to a considerable degree—for example, it may be compressed to a density substantially two-thirds of the density required in the tobacco contained in the cigarettes which are being produced.

The density to which the filler rod is compressed by suction will, however, depend to some extent on the quantity of tobacco contained in any particular portion along the length of the filler rod. That is to say, portions containing more tobacco will be more compressed and densified by the suction than will portions containing less tobacco. Accordingly the trimming device is operated in such a way as to reduce the filler rod to a smaller size at those positions where the untrimmed filler rod contains more tobacco, than at those positions at which it contains less tobacco.

As pointed out above, the resistance offered by the untrimmed filler rod to the flow of air through it varies according to the quantity of tobacco present. Thus the resistance is greater when more tobacco is present, and smaller when less tobacco is present. Accordingly the air pressure in the chamber 70 will be lowest when the greatest quantity of tobacco per unit length of the filler rod is passing the chamber 70, and vice versa. When the pressure on the chamber 70 falls, the element 76 and the rod 77 (FIGURE 9) rise, and actuate the hydraulic amplifier in such a way that the lever 42, and hence the trimming discs 27, are raised. Thus the trimming discs are brought closer to the conveyor band 1 and trim the filler rod to a smaller cross-sectional size. When, on the other hand, the pressure in the chamber 70 falls, due to the fact that less tobacco is passing the chamber, the discs 27 are lowered. In either case the direction and extent of movement of the discs will depend on the pressure existing in the chamber 70.

The hydraulic amplifying unit, FIGURE 9, comprises an oil pump 82 driven by a motor 83 through a belt 84 which drives a pulley 86 to which is fixed a bevel gear wheel 87 engaging a further bevel gear wheel 88. The unit is contained within a casing 89 which is partially filled with oil, the oil level being indicated by the dot and dash line 90. Oil is drawn into the pump through a filter 91, and is discharged through a pipe 92 communicating with three pipes 93, 94, and 95. The pipe 95 is a return pipe having an outlet 96, and the pipe 94 extends to a pressure gauge 97. The pipe 93 feeds oil by way of a conduit 98 to the interior of a slidable sleeve 99 having a central port 100 to admit oil. The sleeve is also provided with spaced ports 101 and 102 through which oil can be admitted to a piston device comprising two pistons 103 and 104.

The sensitive valve comprises two spaced lands 105 and 106 on the rod 80. These are spaced to correspond to the spacing of the ports 101, 102, and in the position shown in FIGURE 9 they cover both those ports and thus prevent any flow of oil to the pistons 103 or 104. Lengthwise movement of the rod 80, however causes either the port 101 or the port 102 to be uncovered so as to admit oil, and as explained above, such movements of the rod 80 are effected in response to changes in air pressure in the air cell 70.

The pistons 103, 104, engage arms 107, 108, pivoted at 109 and 110 respectively. These arms are pivotally connected to a link formed in two parts 111 and 112, the part 111 being pivoted on the end of a crank lever 113 fixed on a shaft 114, see also FIGURE 2, from which it will be seen that the shaft 114 has fixed on it a short lever 115 to which the upper end of the rod 51 is connected. Thus rocking of the shaft 114 effects upward or downward movement of the rod 51. An indicator needle 116, FIGURE 2, is also fixed on the shaft 114 and is arranged to swing over a scale 117, thus giving a visual indication of variations in pressure in the chamber of cell 70.

Referring again to FIGURE 9, the sleeve 99 is arranged to follow the movements of the rod 80, in order to bring the hydraulic pressure loads on the pistons into balance when the pistons have moved a predetermined distance, by bringing the port 101 or 102, which has been opened by movement of the rod, again into register with the land 105 or 106. For this purpose the sleeve 99 is connected by a spring 118 to an arm 119 pivotally connected at 120 to the arm 108. The arm 119 is arranged to pivot about a member 121 referred to later. Thus if, for example, the rod 80 moves downwardly from the position shown in FIGURE 9 (due to reduction of pressure in the chamber 70 and capsules 75), the port 102 in the sleeve 99 will be uncovered and will admit oil to the piston 104 which will move downwardly, turning the arm 108 about its pivot 110. In consequence, the left-hand end of the lever 119, as viewed in FIGURE 9, moves upwardly about the pivot 121, and the right-hand end moves downwardly pulling with it the sleeve 99 so as to bring the port 102 again into register with the land 106. The downward movement of the piston causes the shaft 114 to rock counterclockwise, FIGURES 2 and 9, thereby raising the rod 51 and the right-hand end of the lever 42.

In order to prevent sticking of the sleeve 99, a "dither" device is provided to impart continuous movement of small amplitude to the sleeve. This is imparted by the member 121 which is forked and fits over the arm 119, and is fitted on a rod 122 which carries a similar forked member 123 at its other end. The member 123 fits over a lever 124 pivoted at 125. Oscillatory movement is imparted to the lever 124 through a roller 126 by a further lever 127 which is oscillated by a rod 128 to which oscillatory movement is imparted by an eccentric 129 and spring 229.

The arrangement described above effects up and down movement of the right-hand end of the lever 42, FIGURES 2, 6 and 7, in response to variations in air pressure in the chamber or cell 70. The left-hand end of the lever 42 as viewed in those figures is moved up and down in response to measurement of the wrapped cigarette rod by a beta ray measuring device.

Figure 5:
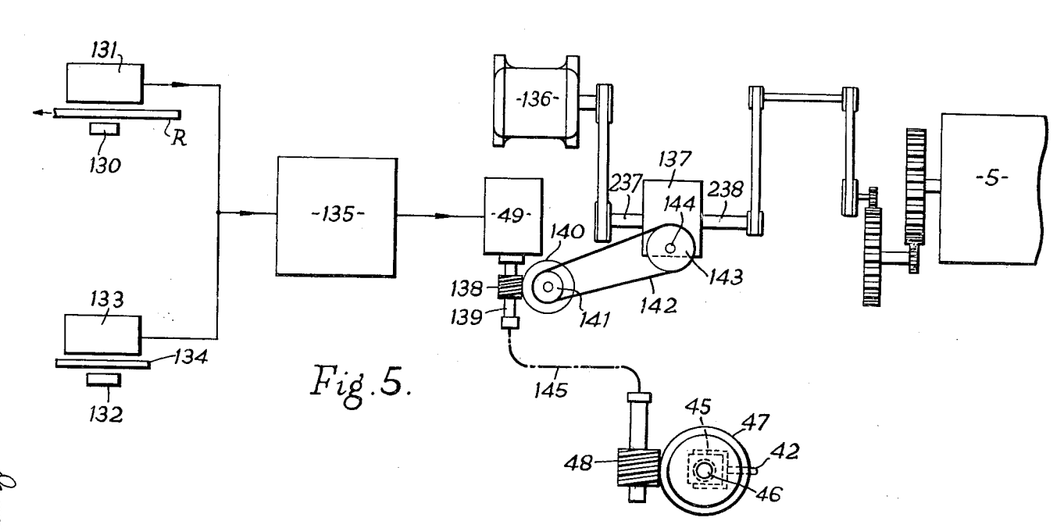

These movements are imparted to the lever 42 by rotation of the screw 46, FIGURE 6, by means of the wormwheel 47 driven by the worm 48, which latter is driven, as diagrammatically shown in FIGURE 5, by a reversible motor 49. FIGURE 5 also shows diagrammatically the arrangement whereby the motor 49 is actuated in response to rod measurements.

The measuring device, FIGURE 5, comprises a source of radiation 130, which may be a radio-active material such as strontium "90", and an ionization chamber 131, the source and the chamber being positioned on opposite sides of the wrapped cigarette rod R. A similar source and chamber 132, 133, are provided with a standard metal screen 134 between them which has a ray absorption equivalent to that of the desired mass of cigarette rod. The effect of beta radiation entering the ionization chambers 131 and 133 through the rod R and screen 134 respectively causes a small current to flow in each of the ionization chambers 131 and 133. The two devices are arranged electrically in opposition so that any current resulting from the measurement is the difference between the currents in each chamber. Thus the source 132 and chamber 133, with the standard screen 134, constitute a balancing device.

The resultant current is utilised to develop a voltage which is amplified in an amplifier 135, from which current passes to the reversible motor 49, and the latter accordingly rotates the worm 48 in one direction or the other, depending upon the result of the measuring operation on the rod R.

FIGURE 5 also illustrates diagrammatically arrangements whereby the speed of the tobacco hopper (i.e. the carded drum 5 and associated feeding devices, FIGURES 2 and 4) may be regulated by the beta ray measuring device so as to regulate the rate at which tobacco is fed to form the filler rod.

The drum 5 and associated feed devices forming the tobacco hopper are driven from a motor 136 through a variable speed device 137 referred to as a variator. The variator 137 is actuated so as either to increase or reduce the hopper speed by means of a worm 138 on the shaft 139 of the reversible motor 49, the worm 138 being arranged to drive a wormwheel 140 to which is fixed a pulley 141 driving a belt 142, which in turn drives a pulley 143 on a shaft 144 which controls the variator, and alters the speed ratio between the input shaft 237 and the output shaft 238 of the variator 137.

The worm 48 previously referred to is simultaneously driven by the reversible motor 49 through a flexible drive 145, diagrammatically shown in FIGURE 5 by a dot and dash line, and in FIGURE 1 by a dotted line.

Thus the beta ray measuring device operates, in response to variations in mass per unit length, to regulate or modify not only the position and hence the operation of the trimming device, but also the rate at which tobacco is supplied to form the filler rod.

The electrical arrangements associated with the beta ray device will be described later with reference to FIGURE 11.

By the arrangement described above, the operation of the machine is regulated or modified by the conjoint action of the detecting device by which variations in air-permeability of the untrimmed filler rod are detected, and of the measuring device by which variations in the mass per unit length of the wrapped rod are measured. This is done by utilising the results of these detecting and measuring operations to control jointly the operation of the trimming device by varying the height of the trimming discs 27, which, as explained above are supported from the lever 42 whose opposite ends are raised or lowered by the operation of the reversible motor 49 actuated by the beta ray device, on the one hand, and by the hydraulic amplifier actuated by pressure variations in the air cell 70, on the other hand.

As has been mentioned above, the opening in the air cell 70, whereby the latter communicates with atmosphere via the conveyor 1 and the tobacco filler rod thereon, has a length equal to about the length of a cigarette. Thus the air pressure at any instant in the air cell 70 depends on the resistance to the passage of air through a short length of the tobacco filler rod, namely about a cigarette length. The chamber or cell 70 is of small volume, as are the pipe 74 and the capsules 75, and consequently the pressure variations which result in raising or lowering of the trimming discs 27 represent variations in resistance to the passage of air through the tobacco contained in a relatively short length of filler rod, or in other words, relatively short term variations.

These variations may, in general, be considered to result from variations in the quantity of tobacco present in the filler rod, although other factors, such as the length of the tobacco shreds, or their condition (e.g. moisture content) may have some effect. Since the apparatus described has a very rapid response, it is possible to control the trimming operation by adjusting the height of the trimming discs in accordance with the air-permeability of that portion of the filler rod which is at any given moment being trimmed. In other words, the trimming device can be adjusted so as to remove the required quantity of tobacco from a given length of filler rod substantially in accordance with the resistance to the passage of air through that length.

The beta ray measuring device, however, which operates on the wrapped cigarette rod formed from the filler rod, measues the mass of tobacco in the filler rod irrespective of other characteristics of the tobacco which may affect the air-permeability of the filler rod. Accordingly the beta ray device (which operates on a filler rod which has already been trimmed) exercises a check or control on the operation of the air-pressure detecting device. Thus if the mass per unit length of the filler rod as detected by the beta ray device is greater or smaller than the desired mass, the reversible motor 49 is actuated to raise the lever 42, and hence the discs 27, if the mass is too great, or to lower the discs if it is too small. Since the beta ray device is intended to exercise a long-term control which is superimposed on the short-term control exercised by the pressure-indicating device, a suitable time constant is interposed between measurement and actuation of the reversible motor, in such a way that the measurement is averaged or integrated over a suitable length of rod, for example a length equivalent to 50 cigarette lengths.

A similar long-term control is exercised by the beta-ray device over the rate at which tobacco is fed from the hopper, so that long-term errors can be corrected at their source.

In addition to the functioning of the air cell 70 and associated apparatus as a detector device to detect variations in the quantity of tobacco per unit length of the filler rod, it can also be considered as detecting variations in draw characteristics of successive portions of the filler rod along its length, since obviously the draw characteristics of the cigarettes produced from a tobacco filler rod are related to the air-permeability of those portions of the filler rod from which those cigarettes are formed. Hence the operation of the control mechanism in response to variations in air-permeability of the filler rod results in the reduction, and perhaps in some cases the removal, (that is total reduction) of variations in draw characteristics as between different cigarettes produced from the filler rod. It will be appreciated that since uniformity in draw characteristics of cigarettes is an important desideratum in cigarette manufacture, the method and apparatus described above, by enabling the air-perameability of the filler rod to be detected continuously, and trimming the filler rod in accordance with the air-permeability so detected to be effected, could be employed as a control based on draw characteristics rather than on mass per unit length, or in other words based on the draw characteristics rather than the weights of the cigarettes. At the same time an over-riding control based on mass per unit length of the trimmed filler rod can be superimposed on this in the manner described above.

Figure 12:
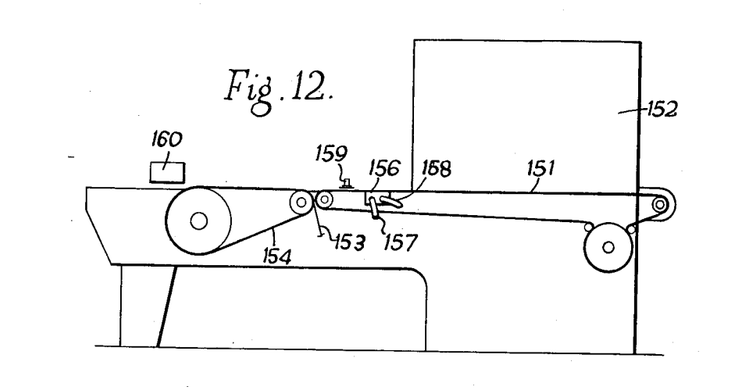
FIGURE 12 is a diagrammatic front elevation of a cigarette-making machine illustrating an alternative arrangement.

Referring now to FIGURE 12, this shows in diagrammatic form a cigarette-making machine which is in general of known type in which a tobacco filler rod is showered on to a conveyor tape 151 from a hopper 152 in conventional manner so as to be supported on the tape and form a filler rod thereon. This filler rod is transferred on to a paper web 153 supported by a conveyor band 154.

In this construction the tape 151 is constructed in any suitable way so as to give free passage to air therethrough—for example it may be a perforated metal band as in the construction already described.

Just beyond the hopper 152 and immediately below the tape 151 is a chamber 156 (corresponding to the chamber 70 in FIGURES 2 and 3) from which air is drawn through a pipe 157 by a suitable fan. A further pipe 158 communicates with a pile of capsules which may be exactly as described with reference to FIGURES 2 and 9.

A trimming device 159 is mounted above the tape 151 just beyond the chamber 156 and operates in the same manner as the device 26 in FIGURE 2, except of course that the filler rod is carried on the upper side instead of the underside of the conveyor tape. Devices are provided coupling the chamber 156 to the trimming discs just as in the construction already described.

Further, a beta ray device 160 may be positioned to measure the cigarette rod just as in the construction already described, and may be arranged to exercise control over the operation of the devices responsive to the chamber 156, just as described above.

In a further alternative arrangement which will be described with reference to FIGURE 12, means are provided to vary the speed of the band 154 carrying the paper web 153 in response to pressure variations in the chamber 156. This arrangement may be as described in U.S. Patent No. 2,815,759. In this arrangement also the beta ray measuring device 160 may if desired be employed to exercise an over-riding control over the operation of the devices responsive to the chamber 156. The purpose of altering the speed of the band is to cause the paper web to draw out, or to consolidate, the tobacco filler delivered to it from the tape 151 in accordance with changes in the relative speeds of the tape 151 and band 154, all as disclosed in U.S. Patent No. 2,815,759. Other arrangements of conveyor bands and means for varying the speed of one or some of them may similarly be employed as disclosed in U.S. Patent No. 2,815,759.

In a still further alternative arrangement, the machine of FIGURE 12 also includes arrangements to vary the speed of the hopper—that is, the rate at which tobacco is delivered from the hopper 152 to the conveyor 151—in the manner already described above with reference to FIGURES 1–10.

This arrangement can further, if desired, include a beta ray device 160 acting on the rod in the manner already described. Further, the control exercised by the chamber 156 may if desired take the form of any one of or any suitable combination of, the three forms of control referred to above—namely, control of a trimming device, control of the speed of a conveyor, and control of the speed of the hopper—and in all cases the functions of the chamber 156 and associated devices may be supplemented by a beta ray or other known measuring device, or the chamber 156 and its associated control devices may be used alone.

It will also be appreciated that in the arrangement described with reference to FIGURES 1 to 10 and 12, the arrangements may if desired include means to vary the speed of the conveyor band 1, or to vary the rate at which tobacco is supplied to the band 1, or both.

Figure 11:
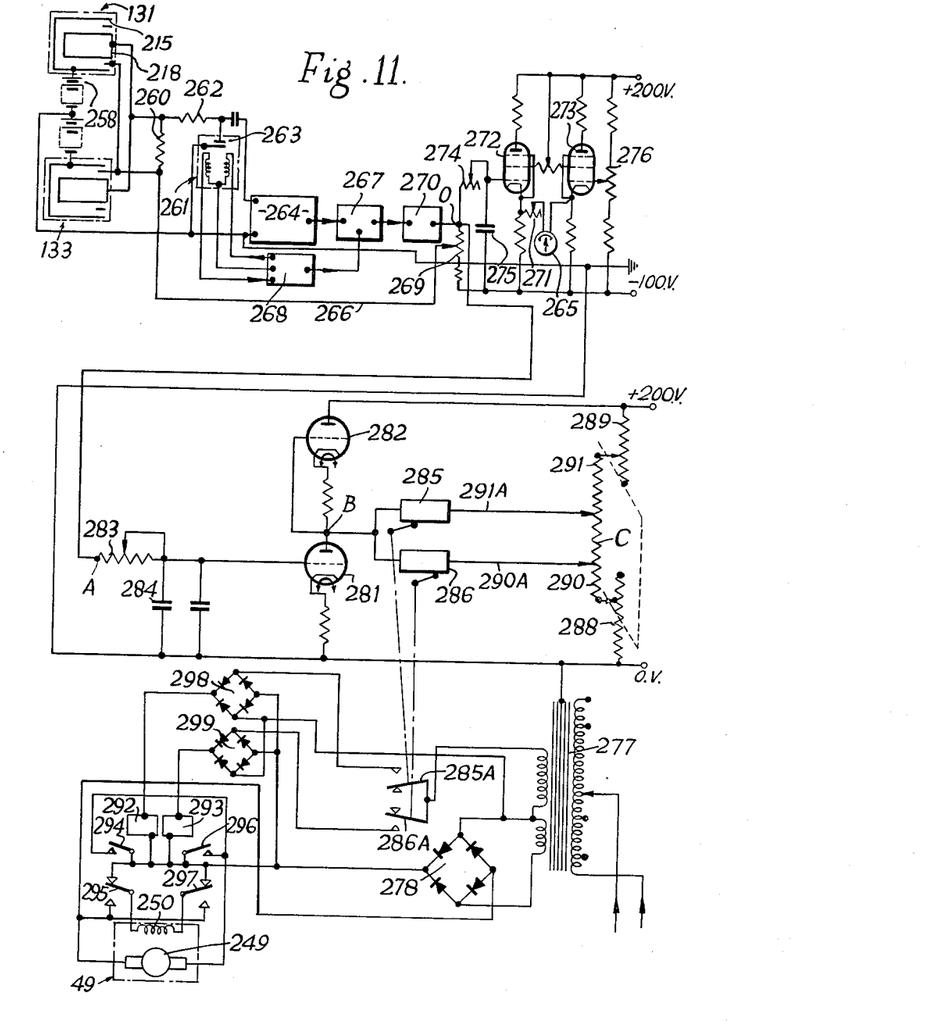
FIGURE 11 is a wiring diagram.

A suitable known circuit for controlling the servo motor 49 and thus the speed of the tobacco feeding apparatus is shown in FIGURE 11. The ionization chambers 131 and 133 of FIGURE 5 are shown, as well as the motor 49. The whole of the other apparatus shown on FIGURE 11 may be regarded as contained within the rectangle 135, FIGURE 5. A source of D.C. voltage, the battery 258, is applied between the inner and outer electrodes 218 and 215 of the chamber 131. The current due to the difference between the currents in chambers 131 and 133, develops a voltage, across a high value resistance 260.

The output voltage must be amplified before it can be put to practical use, and because it is essentially a direct current, a form of D.C. amplifier is necessary.

A vibrating condenser electrometer 261 is provided in which the input D.C. potential is first converted to A.C. by applying it through a resistance 262 to a condenser 263 the capacity of which changes at a suitable frequency (500 cycles). An A.C. voltage proportional to the D.C. input is developed across this condenser, which is passed into a conventional A.C. amplifier 264 and subsequently rectified to produce a D.C. voltage proportional to the deviation from the desired weight and of the same polarity as the signal.

This output voltage, in addition to energising a direct reading meter 265 operates the tobacco feed-correcting devices.

From the A.C. amplifier 264 current passes to a phase-sensitive rectifier 267 which works in synchronism with a maintaining circuit 268 for the vibrating condenser; by this means the output voltage developed at a point O across a cathode follower load resistance 269 which receives current from a cathode follower 270, which point is normally at the same potential as the earth line, will change to a positive value or a negative value dependent on whether the output from the measuring chamber relative to that from the balancing chamber is greater or less; in addition provision is made for a controllable portion of this voltage to be fed back along line 266 to the input to stabilise the amplifier against internal variation and to allow adjustment of overall sensitivity.

The indicating meter 265 is connected in series with a variable resistance 271 (to adjust the sensitivity of the meter) between the cathodes of two tubes 272 and 273, the whole arrangement forming a balanced tube voltmeter. The circuits of these tubes are arranged by adjusting a resistance 276 so that with the point O at earth potential the two cathodes are at the same potential and there is no current in the centre-zero meter 265. The circuits of the phase-sensitive rectifier 267 and cathode follower 270 are also arranged so that when the output from the measuring chamber 131 is the same as that from the balancing chamber 133 that point O is at earth potential.

As a result, when the meter 265 is in the zero position the mass of the filler rod is at the desired value and when this value varies, the indication on the meter will follow the change.

An integrating circuit is provided between the meter and the measuring circuit so that the indication will be in accordance with the average mass measured over the desired period. This is accomplished by an integrating circuit formed by a resistance 274 and condenser 275. When the potential at the point O changes, the control grid of the tube 272 cannot follow immediately because of the large capacity of condenser 275 which must alter its charge, and the speed at which this takes place depends on the value of the resistance 274 which is adjustable.

The output from the amplifier terminals passes to a limit selector unit, shown in the lower part of FIGURE 11 and designed to vary the feed rate of tobacco from the hopper to the conveyor on which the filler rod is formed, when the average weight of the filler rod being produced deviates too much from the desired weight.

Referring now to the lower part of FIGURE 11 the limit selection unit comprises a transformer 277, a rectifier 278, a twin triode tube amplifier with tubes 281 and 282, an adjustable time-constant circuit comprising resistance 283 and condenser 284, two polarised relays 285 and 286, balancing potentiometers 288 and 289 ganged for simultaneous operation and potentiometers 290 and 291 for "heavy" and "light" limit adjusting respectively. The input voltage is applied between a point A and the earth line, to the integrating circuit 283—284 which is adjusted to have the same time-constant as components 274—275 in the upper part of the figure. The output voltage across condenser 284 is applied to the grid of tube 281. Assume first that the sliding contacts 290A and 291A of potentiometers 290 and 291 are touching the middle point C and the potential of point C has been adjusted to agree with that at point B when the input at point A is at earth potential. The contacts 285A and 286A of the polarised relays 285 and 286 are adjusted mechanically so that they do not make contact under these conditions, but the contacts of relay 285 will close should point B become slightly more positive than point C and similarly the contacts of relay 286 will close when point B becomes less positive than point C.

Under these conditions of balance, when the voltage at point A changes from that of earth potential and causes the grid of tube 281 to change, that is, when the average weight deviates too much from the set value, an amplifier inverse change (that is, when grid goes positive, anode goes negative) will occur at point B and current will flow through both the windings of the polarised relays. If point B has become more positive, relay 285 will close its contacts 285A as already mentioned.

Assume now that the sliding contacts of potentiometers 290 and 291 are moved away from point C and that point A is again at earth potential, then the potential of point B will be as before but current will now be flowing through relays 285 and 286 in the direction opposite to that necessary to cause contact closure. Under these new conditions the potential of point B will have to change more than before to cause the current through the relays to reverse and cause their contacts to close. By this means the amount of weight deviation necessary before the relays operate to alter the rate of change of hopper feed can be accurately controlled.

D.C. supply to the armature 249 of the motor 49 is from the rectifier 278, and the direction of the current is controlled by two magnetically operated switches 292 and 293 supplied from rectifiers 298 and 299 respectively each having two control arms 294, 295 and 296, 297 respectively. Movements of the relay contacts 285A or 286A will complete a circuit to one of the switches 292 and 293 and the respective relay contacts will feed current to the armature 249, field 250 and the motor will run one way or the other according to the circuit made, and adjust the variator 137, FIGURE 5, to alter the speed of the tobacco feeding apparatus.

We claim:

1. A tobacco manipulating machine comprising feeding means to feed tobacco to form a continuous tobacco filler rod, an air pervious conveyor to convey the filler rod lengthwise, opposed side walls between which the filler rod is conveyed by the conveyor, means to pass air into and through the filler rod and the conveyor in a direction transverse to the lengthwise direction of the filler rod, while the latter is moving through the machine, the opposed side walls cooperating with the conveyor to confine the filler rod laterally around part of its periphery, the walls defining a flow path for the air from the side opposite to that constituted by the air pervious conveyor, whereby the whole cross-section of the filler rod is traversed by the air, detector means to detect variations in the uniformity of the moving filler rod, the detector means comprising means to detect variations in a characteristic of the air flow, which variations result from differences in the resistance to the passage of air through the filler rod at different positions along the length of the moving filler rod, a trimming device positioned to remove surplus tobacco from the filler rod, and means to vary the operation of the trimming device so as to cause it to reduce variations in uniformity of the trimmed filler rod, said last-named means being operatively connected to and actuated by the said detector-means.

2. A machine as claimed in claim 1, wherein the said trimming device is located downstream of a position at which variations in air-permeability of the filler rod are detected.

3. A machine as claimed in claim 1, wherein the filler rod is held by suction to an air-pervious conveyor which carries it lengthwise.

4. A machine as claimed in claim 1, comprising an indicating device to give a visual indication of the variations in a characteristic of the airflow.

5. A machine as claimed in claim 1, comprising a measuring device arranged to measure the mass per unit length of the trimmed filler rod, and means actuated by the said measuring device to regulate the operation of the machine in cooperation with the said means actuated by the said detector-means.

6. A machine as claimed in claim 5, wherein the said means actuated by said measuring device is actuated in response to long-term variations in the mass per unit length of the filler rod, and wherein the said means actuated by the said detecting device is actuated in response to short-term variations in air-permeability of the filler rod.

7. A machine as claimed in claim 5, wherein the said measuring device is located downstream of the trimming device so as to measure the trimmed filler rod, whereby the said measuring device exercises a control on the operation of the trimming device as regulated by the said detector device.

8. A machine as claimed in claim 1, comprising a chamber having an opening adjacent the conveyor at that side of the latter remote from the filler rod, and wherein the means to cause air to pass through the filler rod draws air from the chamber so that variations in air pressure occur within the chamber.

9. A machine as claimed in claim 8, comprising means actuated by the said measuring device and arranged to regulate the rate at which tobacco is supplied to the filler rod.

10. A machine as claimed in claim 8, wherein the said opening has substantially the same width as the filler rod and has a length substantially equal to the length of a tobacco article to be produced by the machine.

11. A machine as claimed in claim 8, wherein the said detector-means to detect variations in air-permeability of the filler rod comprises a flexible element one side of which is subjected to the air pressure in the chamber so as to be movable in response to variations in the pressure in the chamber.

12. A machine as claimed in claim 11, wherein the said flexible element forms part of a container whose interior is in communication with the interior of the chamber and whose exterior is exposed to atmosphere.

13. A machine as claimed in claim 11, comprising a hydraulic amplifier having an input member arranged to be operated in response to movements of the said flexible element and an output member arranged to effect bodily movement of the trimming device, whereby the said bodily movement is effected in response to pressure variations in the said chamber.

14. A machine as claimed in claim 8, wherein the said means to vary the operation of the trimming device is also operatively connected to and actuated by the said measuring device.

15. A machine as claimed in claim 14, comprising a support member supporting said trimming device for bodily movement, opposite ends of said member being operatively connected to the detector-means and the said measuring device respectively.

16. A machine as claimed in claim 1, wherein the trimming device is mounted for bodily movement relatively to the filler rod, and wherein the said means to vary the operation of the trimming device is arranged to cause such bodily movement.

17. A machine as claimed in claim 16 and comprising a measuring device arranged to measure the mass per unit length of the filler rod, means actuated by said measuring device to regulate the operation of the machine, and a member which is coupled to the said means actuated by said detector means on the one hand and to the said means actuated by said measuring device on the other hand, wherein the said trimming device is arranged to have said bodily movement imparted to it by said member.

18. A machine as claimed in claim 16, wherein the said trimming device is arranged for said bodily movement in directions towards and away from the said conveyor.

19. A continuous rod cigarette-making machine comprising means to form a continuous tobacco filler rod, an air-pervious conveyor on which the filler rod is conveyed lengthwise, suction means to draw air through the filler rod and conveyor to hold the filler rod thereon, opposed side walls between which the filler rod is conveyed by the conveyor and which confine the filler rod laterally around part of its periphery, a chamber on that side of the conveyor remote from the filler rod and having an opening adjacent the conveyor, a source of suction to draw air through the filler rod, the conveyor and the chamber, the walls defining a flow path for the air from the side opposite to that constituted by the conveyor, whereby the whole cross-section of the filler rod is traversed by the air, pressure-responsive means responsive to variations in air pressure in the chamber, a trimming device arranged to trim excess tobacco from the filler rod downstream of the chamber, an adjustable mechanical linkage supporting said trimming device for movement toward and away from the conveyor to vary the amount of excess tobacco removed from the filler rod and thus to vary its cross-sectional area, a hydraulic amplifier having an output member arranged to adjust said linkage and an input member arranged to be operated by the pressure-responsive means, a measuring device utilising a source of beta radiation for measuring variations in the mass per unit length of the trimmed filler rod, and electrical servo-mechanism arranged to adjust said linkage in response to variations in the absorption of beta rays by the filler rod.

20. A tobacco manipulating machine comprising feeding means to feed tobacco to form a continuous first tobacco filler rod having at all points along its length a surplus of tobacco over that required in the final filler rod, means to convey said first filler rod lengthwise, a trimming device to trim the first tobacco filler by separating and removing surplus tobacco therefrom, detector means to detect variations in the uniformity of the first filler along the length of the latter, and produce a signal in accordance with said variations, control means responsive to said signal and operably connected to said trimming device to control the amount of surplus tobacco separated and removed from the filler rod to reduce said variations, and operably connected to said feeding means to control the amount of tobacco fed to form the filler rod to reduce said variations.

21. A machine as claimed in claim 20, wherein the detector means comprises a source of penetrative radiation directed at the trimmed filler rod and means to produce an electrical signal in accordance with the amount of radiation absorbed by the trimmed filler rod.

22. A method of detecting variations in the uniformity of a continuous tobacco filler rod as it is produced on a machine and while it is being conveyed lengthwise through the machine, which method comprises passing air through and across the filler rod in a direction transverse to the lengthwise direction of the filler rod and detection variations in a characteristic of the airflow, which variations result from differences in the resistance to the passage of air through the filler rod at different positions along the length of the filler rod, measuring the mass per unit length of the filer rod, and regulating the operation of the machine in accordance with said variations of airflow, and in accordance with variations in mass per unit length of the filler rod as indicated by such measurement, in such a way as to reduce variations in the uniformity of the filler rod.

23. A method as claimed in claim 22, wherein a trimming operation is effected on the filler rod and is controlled in accordance with the said variations in mass per unit length of the filler rod as well as in accordance with the said variations in air-permeability of the filler rod.

24. A method as claimed in claim 22, wherein the operation of the machine is regulated in accordance with long-term variations in the mass per unit length of the filler rod, and in accordance with short-term variations in air-permeability of the filler rod.

25. A method as claimed in claim 22, wherein the rate at which tobacco is supplied to the filler rod is regulated in accordance with variations in the mass per unit length of the filler rod.

26. In a tobacco manipulating machine in which a continuous first tobacco filler rod is formed with a surplus of tobacco at all points along its length over that required in the final filler rod and fed lengthwise, and is trimmed to separate and remove surplus tobacco therefrom, a method of reducing variations in the uniformity of the trimmed filler rod along the length of the latter, which method comprises the steps of detecting variations in the uniformity of the trimmed filler rod, and utilizing the results of the detecting operation to control the trimming operation on the first filler rod to control the amount of surplus tobacco separated and removed thereby, and also to control the operation of feeding tobacco to form the first filler rod, both said trimming operation and the feeding operation being controlled in the sense to reduce variations in the uniformity of the trimmed filler rod.

27. The method as claimed in claim 26 wherein variations in uniformity of the trimmed filler rod are detected by detecting variations in mass per unit length of the trimmed filler rod by means of penetrative radiation to produce an electrical signal which varies with said variations, and whereon the trimming operation and feeding operation are controlled in accordance with said electrical signal.

28. In the manufacture of a continuous cigarette rod by forming a continuous first tobacco filler rod with a surplus of tobacco at all points along its length over that required in the continuous cigarette rod, feeding the continuous first filler rod lengthwise and carrying out a trimming operation on the first filler rod to separate and remove surplus tobacco so that a continuous trimmed tobacco filler rod remains for the formation of the cigarette rod, a method of improving the uniformity of the trimmed filler rod which comprises the steps of detecting variations in the quantity of tobacco fed from the trimming operation, and controlling the rate of feed of tobacco to form the first filler rod in accordance with the detected variations to reduce variations in the uniformity of the surplus tobacco and thereby to reduce variations in the uniformity of the trimmed filler rod.

29. A method of detecting variations in the uniformity of a continuous filler rod as it is produced on a machine and while it is being conveyed lengthwise through the machine on a conveyor, which method comprises passing air through and across the filler rod in a direction transverse to the lengthwise direction of the filler rod and detecting variations in a characteristic of the airflow, which variations result from differences in the resistance to the passage of air through the filler rod at different positions along the length of the filler rod, trimming the filler rod to remove therefrom surplus tobacco extending beyond a predetermined distance from the conveyor, and varying said predetermined distance in accordance with said variations in airflow in such a way as to reduce variations in uniformity of the filler rod.

References Cited in the file of this patent

UNITED STATES PATENTS

| 2,465,818 | Richardson | Mar. 29, 1949 |
| 2,660,177 | Rault | Nov. 24, 1953 |
| 2,800,131 | Molins et al. | July 23, 1957 |
| 2,815,759 | Molins et al. | Dec. 10, 1957 |
| 2,904,050 | Kiefer et al. | Sept. 15, 1959 |
| 2,909,180 | Molins et al. | Oct. 20, 1959 |
| 2,938,521 | Lanore | May 31, 1960 |
| 2,952,262 | Pocock et al. | Sept. 13, 1960 |

FOREIGN PATENTS

| 331,333 | Great Britain | July 3, 1930 |